US012791771B2

(12) United States Patent
Raggio

(10) Patent No.: US 12,791,771 B2
(45) Date of Patent: Nov. 10, 2026

(54) OPTICAL DIFFUSER HAVING LENSLETS COUPLED TO CONTAINER TO IMPROVE PHOTO CAPTURE FOR IMPROVED PHOTOCHEMICAL REACTIONS

(71) Applicant: RAYOTEK SCIENTIFIC, INC.

(72) Inventor: William Raggio, Del Mar, CA (US)

(73) Assignee: RAYOTEK SCIENTIFIC, LLC, San Diego, CA (US)

( * ) Notice: Subject to any disclaimer, the term of this patent is extended or adjusted under 35 U.S.C. 154(b) by 173 days.

(21) Appl. No.: 18/584,569

(22) Filed: Feb. 22, 2024

(65) Prior Publication Data

US 2024/0280735 A1 Aug. 22, 2024

Related U.S. Application Data

(60) Provisional application No. 63/486,283, filed on Feb. 22, 2023.

(51) Int. Cl.

| | |
|---|---|
| ***G01N 21/03*** | (2006.01) |
| ***G02B 3/00*** | (2006.01) |
| ***G02B 5/02*** | (2006.01) |

(52) U.S. Cl.

CPC ......... *G02B 5/0268* (2013.01); *G02B 3/0006* (2013.01); *G02B 3/0012* (2013.01);
(Continued)

(58) Field of Classification Search

CPC ...... G02B 3/0012–0031; G02B 3/0075; G02B 5/021–0221; G02B 5/0231; G02B 5/0268; G02B 5/0278; G02B 5/0294; G01N 2021/0389; G01N 2021/0392; G01N 21/0303; G01N 2021/0378; G01N 2021/0385; G01N 2021/4754; B01L 3/08;
(Continued)

(56) References Cited

U.S. PATENT DOCUMENTS 6,446,467 B1 9/2002 Lieberman et al.
2008/0006859 A1 * 1/2008 Mionetto ......... B29D 11/00009 257/E31.127

(Continued)

FOREIGN PATENT DOCUMENTS

JP 4-353803 12/1992
JP 2001-512245 8/2001

(Continued)

OTHER PUBLICATIONS

English translation of JP 2009157340 A (Ogasawara) retrieved from https://worldwide.espacenet.com (Year: 2009).*

(Continued)

*Primary Examiner* — Ryan S Dunning
(74) *Attorney, Agent, or Firm* — ARC IP Law, PC; Joseph J. Mayo

(57) ABSTRACT

Optical diffusers and methods of manufacturing thereof are described herein. In some aspects, a method of manufacturing an optical diffuser can include forming lenslets on glass or plastic to remove any sharp scattering surfaces to form an optical diffuser; coupling a container with said optical diffuser in which said container is configured to hold a chemical, wherein said lenslets transmit over a percentage of light through said optical diffuser and said percentage of light is over 80%.

13 Claims, 3 Drawing Sheets

(52) U.S. Cl.
CPC ......... *G02B 3/0075* (2013.01); *G02B 5/0278* (2013.01); *G01N 2021/0389* (2013.01); *G01N 2021/0392* (2013.01); *G02B 5/021* (2013.01); *G02B 5/0215* (2013.01); *G02B 5/0294* (2013.01)

(58) Field of Classification Search
CPC ........ B01L 3/505; B01L 3/508; B01L 3/5082; B01L 2300/0654; B01L 2300/0858; B01L 2300/168; B29D 11/00365; B29D 11/00384
See application file for complete search history.

(56) References Cited

U.S. PATENT DOCUMENTS

| | | | |
|---|---|---|---|
| 2011/0277361 A1 | 11/2011 | Nichol et al. | |
| 2012/0135512 A1 | 5/2012 | Vasylyev | |
| 2012/0140333 A1* | 6/2012 | Tomczyk | G02B 27/0961 359/619 |
| 2015/0293271 A1 | 10/2015 | Miyasaka et al. | |
| 2017/0038597 A1* | 2/2017 | Li | G02B 30/28 |
| 2019/0331948 A1* | 10/2019 | Zhang | G02F 1/1347 |
| 2020/0166690 A1 | 5/2020 | Rose et al. | |

FOREIGN PATENT DOCUMENTS

| | | |
|---|---|---|
| JP | 2009157340 A * | 7/2009 |
| JP | 2013-525836 | 6/2013 |
| JP | 2014-130200 | 7/2014 |
| JP | 2020-526783 | 8/2020 |

OTHER PUBLICATIONS

International Search Report and Written Opinion Issued in PCT/US24/17047 issued on Jun. 5, 2024.
Office Action issued in JP2024-559435 on Apr. 28, 2026, and English machine translation thereof.
First Examination Report received in 202417060344 from Intellectual Property India on Jul. 24, 2026, and English Translation Thereof (7 pages).
International Preliminary Report on Patentability issued in PCT/US2024/017047 on Sep. 3, 2026.

* cited by examiner

OPTICAL DIFFUSER HAVING LENSLETS COUPLED TO CONTAINER TO IMPROVE PHOTO CAPTURE FOR IMPROVED PHOTOCHEMICAL REACTIONS

CROSS-REFERENCE TO RELATED APPLICATION

The application claims the benefit of U.S. Provisional Patent Application No. 63/486,283, filed 22 Feb. 2023, the disclosure of which is hereby incorporated herein by reference.

FIELD OF THE INVENTION

One or more aspects of the present disclosure are related to the field of construction and use of an optical diffuser to enable a chemical reaction to be performed with the use of light to cause, and/or catalyze chemical reactions, typically called a "photochemical reaction". More particularly, but not by way of limitation, one or more aspects of the present disclosure enable an optical diffuser to improve photon capture for improved photochemical reactions.

DESCRIPTION OF THE RELATED ART

Light diffusers are common in many applications from household appliances and area lighting to commercial, industrial and office applications, and most commonly seen in lighting application to diffuse and/or soften lighting. Optical diffusers are also light diffusers, but with more engineering to define how they diffuse light in a controlled (engineered) manner. Optical diffusers are also be called "engineered" diffusers where the diffusing is performed in a very controlled manner to create well defined patterns with repeatable, accurately predictable distribution of light. Optical diffusers can be tailored to the application, whereas the more common non-optical diffusers have minimal control over the distribution of light. Engineered optical diffusers have not been utilized to date for photochemical reaction containers. FIG. 2A shows an example of a prior art diffuser that utilizes non-optical diffuser transmission that is generally in the 50% transmission range, meaning that roughly 50% of the light is transmitted through the diffuser.

Typically, a container or window for use in a photochemical reaction is made of polished glass, but may be polished sapphire, plastic, or other transparent materials. Glass types may be fused silica, borosilicate, soda lime glass, fused quartz, aluminosilicate, etc. See FIG. 1.

Known diffusers are available for photochemical reactions generally allow for roughly no more than 50% transmission and are hard to clean.

For at least the limitations described above there is a need for an optical diffuser to improve photon capture for improved photochemical reactions.

BRIEF SUMMARY OF THE INVENTION

One or more aspects described in the present disclosure are related to an optical diffuser to improve photon capture for improved photochemical reactions.

At least one aspect of the invention uses a transparent container or window, but the internal and/or external surfaces of the container and/or window are constructed with an engineered optical diffuser (on the inside and/or outside surfaces of the diffuser with respect to the inside or outside of a container to which the diffuser is coupled). Transparent as utilized herein means that light passes through so that objects behind the diffuser can be distinctly seen. The purpose of this diffuser(s) is:

- The light being used to cause, or catalyze a chemical reaction is homogenized, supporting more uniform, controlled radiation of the chemistry.
- Since the signal is homogenized, hot spots can be avoided. Hot spots can either damage the chemicals being exposed to the light, and/or wastes photons if more photons are focused in small areas than the concentration of chemical requires for 100% reaction.
- If the light source is a laser, lasers tend to focus too much light in a small area (see "hot spot" above). An optical diffuser ensures a controlled, "strategic" spread of the laser light to optimize the photoreaction. Because optical diffusers are designed to optimize the cone angle (Full Width Half Max, "FWHM"), the desired cone angle can be engineered to maximize reaction efficiencies.
- Minimize lost efficiencies by minimizing shadowing that can happen when the light is being transmitted directly through the transparent container and/or window(s) without appropriate diffusion. Shadowing is caused by the chemical itself absorbing and/or blocking deeper penetration of the photons, and thus preventing the chemical deeper into the chamber from reacting as fast and efficiently as it could with a diffuser.

BRIEF DESCRIPTION OF THE DRAWINGS

The above and other aspects, features and advantages of the invention will be more apparent from the following more particular description thereof, presented in conjunction with the following drawings wherein.

DETAILED DESCRIPTION OF THE INVENTION

An optical diffuser and methods of manufacture thereof to improve photon capture for improved photochemical reactions are described herein. In the following exemplary description, numerous specific details are set forth in order to provide a more thorough understanding of aspects of the invention. It will be apparent, however, to a person of ordinary skill that the present disclosure may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Aspects of the present disclosure enable construction and use of an optical diffuser to enable chemical reactions to be performed with the use of light to cause, and/or catalyze chemical reactions, typically called "photochemical reaction". Aspects enable a more uniform controlled radiation of the chemistry, while avoiding hot spots and by minimizing shadowing. The wavelengths of the light can be single wavelengths, as created by lasers, or multiple wavelengths, or a wide bandwidth of wavelengths. The wavelengths can be visible, IR, UV, microwaves and/or radio waves.

In general, the present disclosure includes the use of engineered optical diffusers that allow for light refraction and inhibit light scattering through a material, as opposed to more traditional commercial light diffusers. These traditional commercial light diffusers are usually made from molded plastic, or sand blasted or mechanically abraded glass (flat and/or curved shapes). Sand blasting or other abrading methods create light scattering, which can achieve a moderate level of light diffusion by what is called scattering.

Scattering is an optical phenomenon where light hits small reflective, flat "facets" and reflects much of the light in random directions, both sideways and backwards, away from the chemical it is supposed to expose. Sand blasting, bead blasting, grinding, sanding, etc., all create millions of very small facets, often invisible to the naked eye but still large compared to the wavelengths of the light irradiating it. The end result is typically at least half the light hitting the outside surface of the container or window is reflected away from the chemical and thus wasted light, time, and ultimately, money.

Figure 1:
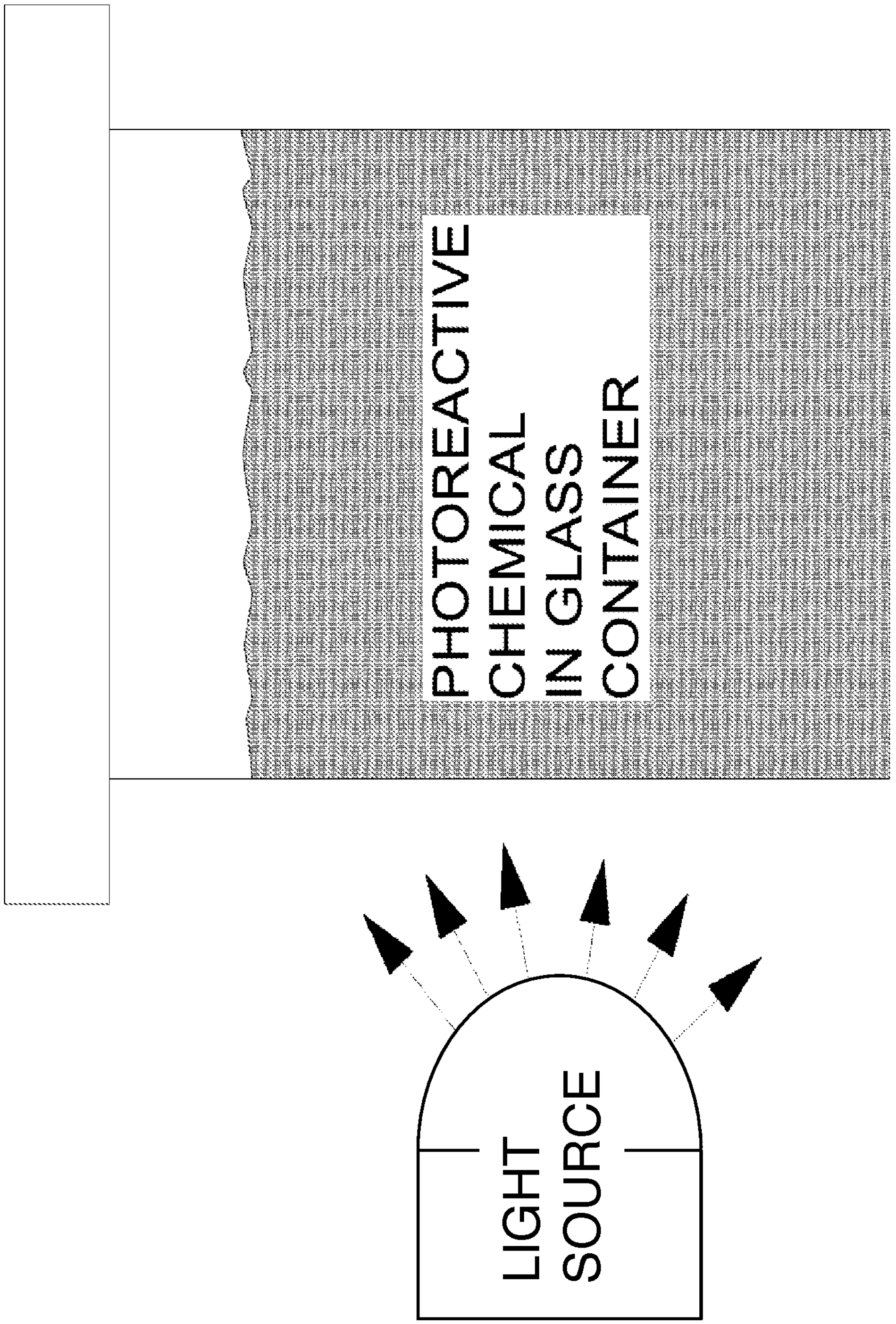
FIG. 1 shows a photoreactive chemical in a glass container exposed to a light source according to the prior art.

FIG. 1 shows at least one aspect of the invention that relies on the photoreactive chemical being in a clear container, e.g., glass, or, a container having one or more transparent windows. Non-limiting examples of containers suitable for photochemical reactions include a reaction chamber, flask, beaker, tube, bottles. In some aspects, the container can be a borosilicate glass reaction chamber, flask, beaker, or the like. In another aspect, the container can be fused silica or borosilicate glass tube. In other aspects, the container can be a sapphire tube. In yet another aspect, the container can be a clear plastic bottle or reaction chamber, i.e., made from a material that allows light to pass through in a transparent manner or even translucent manner. In certain aspects, the container can be a metal or opaque plastic container with glass (e.g., borosilicate, fused quartz, etc.) window(s), such that light does not pass through the container. In one or more aspects the light may be visible light or may be outside of the visible spectrum (380 to 700 nm).

Figures 2A, 2B:
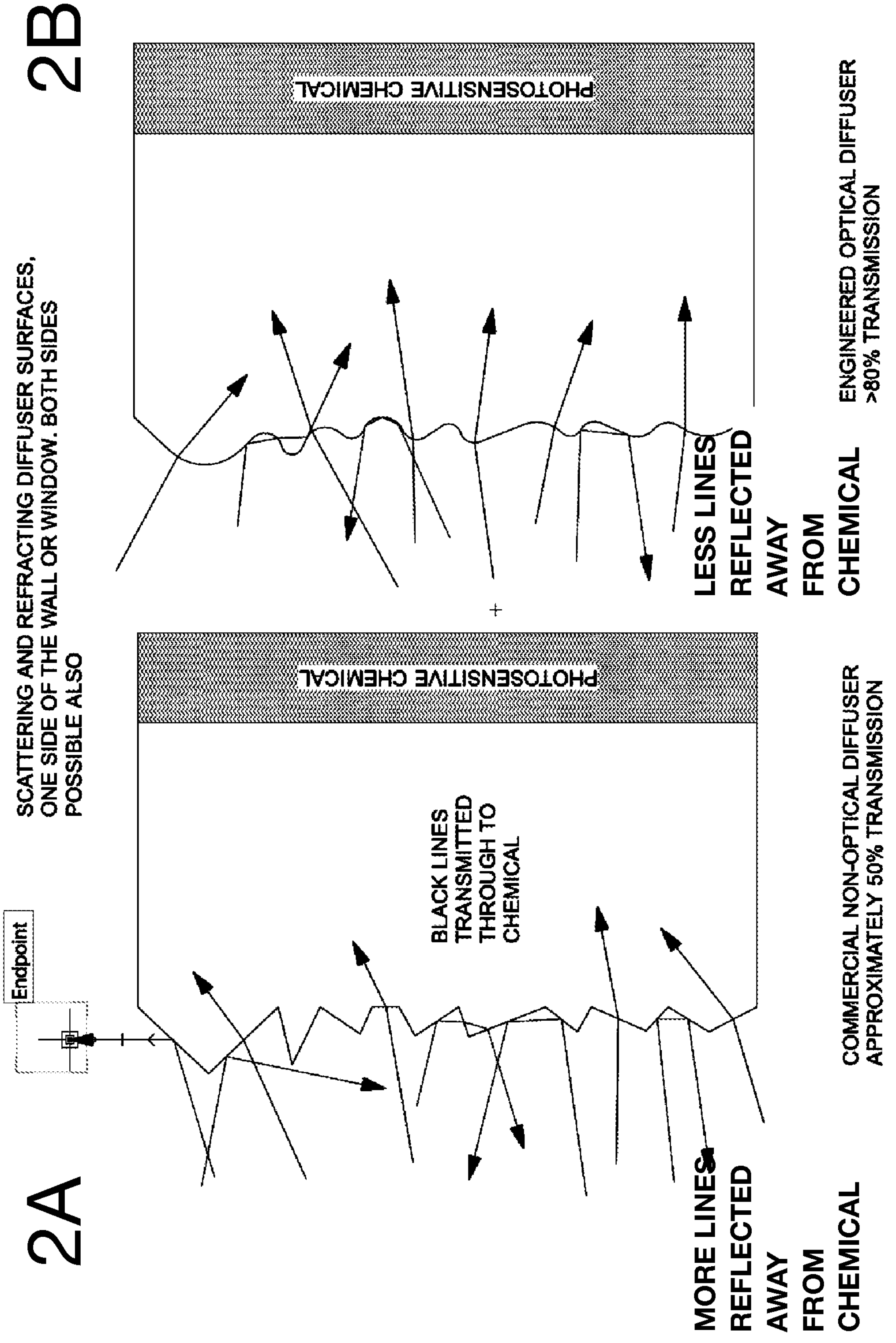
FIG. 2A Prior Art
FIG. 2A shows non-optical diffuser with approximately 50% light transmission versus engineered optical diffuser with at least 80% transmission rates.
FIG. 2B shows an optical diffuser coupled to a container, consistent with the implementations of the current subject matter.

At least one aspect of the invention places an optical diffuser on one or both surfaces, e.g., inner surface and/or outer surface, of a wall of a container or window. The engineered diffusive surface of the optical diffuser can be created by controlled grinding, and or, laser patterning of the surface(s), optionally followed by a chemical etch that selectively patterns the surface(s). A thermal process can be used to passivate or "polish" the patterned surface(s), remove any stress in the glass, and strengthen the container. The resulting surfaces allow far less reflected light, such that more light reaches the chemical as shown in FIG. 2B (on the right side of the page wherein more of the light rays pass into and thus through the diffuser toward and to the photosensitive chemical).

A properly designed optical diffuser does not rely on light scatter, but instead, relies on light refraction. An optical diffuser strategically places millions of lenslets across the surface(s) of the one or more inner surfaces and/or one or more outer surfaces of the container or window. Typically, greater than about 80% of the light hitting the surface of the optical diffuser makes it through to the other side (e.g., transmitted light), thereby allowing the chemical contained within the container to absorb at least a portion of the transmitted light. In some aspects, the amount of light transmitted can be from about 80% to about 99%, from about 80% to 95%, from about 85% to 99%, from about 85% to 95%. The light that is utilized depends on the type of chemical reaction desired and may be of any wavelength required including but not limited to infrared, visible, ultraviolet.

The word "about" when immediately preceding a numerical value means a range of plus or minus 10% of that value, e.g., "about 50" means 45 to 55, "about 25" means 22.5 to 27.5, etc. Furthermore, the phrases "less than about" a value or "greater than about" a value should be understood in view of the definition of the term "about" provided herein.

One or more aspects of the invention utilize one or more acids to etch the surfaces of abraded surfaces in order to achieve refractive micro-optics (lenslets) on the desired surfaces of a glass processing chamber. In some aspects, the one or more acids can include hydrofluoric (HF) and ammonium bifluoride (ABF). To achieve the proper lenslets, the desired surfaces must be abraded in a controlled manner. This roughened surface can be achieved by several methods including sand blasting and grinding.

Once the surface is ground, soaking in acid will passivate the surfaces, remove any sharp, scattering surfaces, and if performed for the proper amount of time, concentration, and temperature, can result in desirable lenslets that can refract light (as opposed to the undesirable scattering).

For plastic type transparent materials, solvents can be used in lieu of acids to passivate the surfaces. As with acids on glass, the proper concentration and temperature will change depending on the type of plastic being used. Example solvents that may be utilized include acetone, gamma-butyrolactone, various hydroxides.

Alternatively, or in combination, in one or more aspects of the invention lasers, e.g., pico and femto lasers, can be used to pattern surfaces, creating lenslets and other shapes of micro-optics on glass and plastic surfaces to create the desired refractive diffusion of light through these transparent materials.

Alternatively, or in combination, lithography is a common method in semiconductor processing to achieve well controlled surfaces on optical surfaces and can be designed for specific optical diffusion of light.

Another benefit of optical diffuser is that such its surfaces can be easier to clean compared to scattering diffusers. This is because a properly designed optical diffuser does not generally include small microcracks, fissures, and other features that trap contaminants, whereas a conventional scattering diffuser includes numerous contaminant traps that are almost impossible to clean out.

Figure 3:
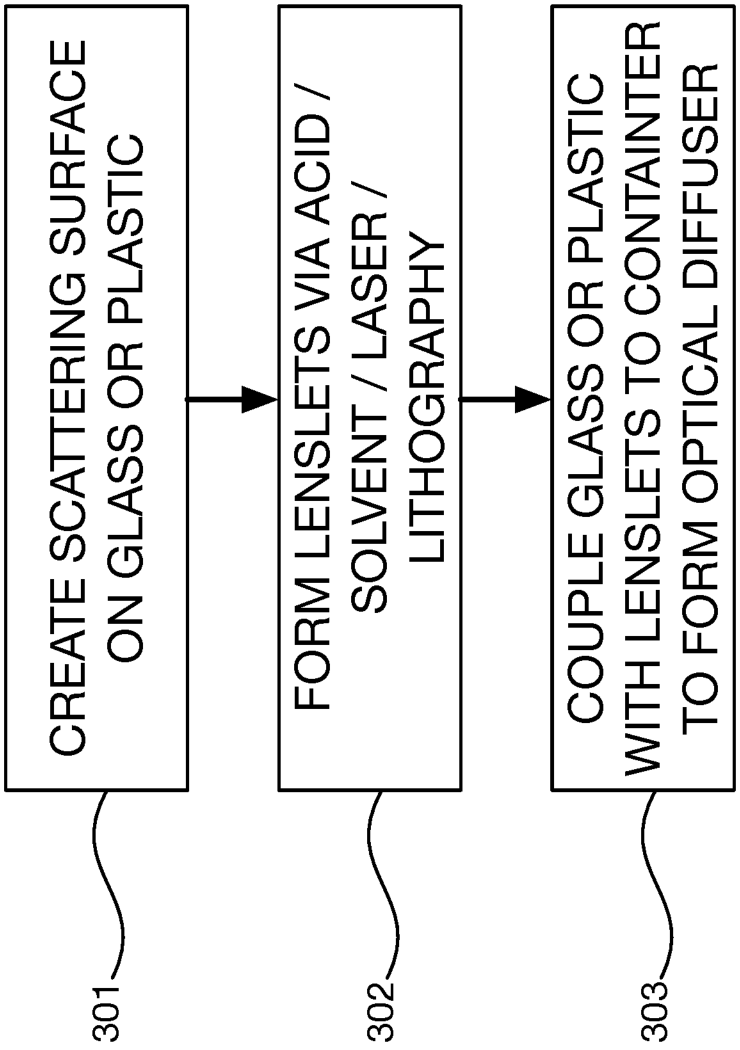
FIG. 3 shows a method of manufacture of an optical diffuser according to one or more aspects of the invention.

FIG. 3 shows a method of manufacturing at least one aspect of the invention. As shown at 301, a scattering surface is formed on glass or plastic through any type of technique including but not limited to abrasion. At 302, lenslets are formed on the glass or plastic using solvent (for some plastics), or for plastics and glasses or other transparent materials, acid, laser or lithography. The lenslet-based component (optical diffuser) is then coupled to a container to form optical diffusion to improve photon capture for improved photochemical reactions.

While the invention herein disclosed has been described by means of specific aspects and applications thereof, numerous modifications and variations could be made thereto by those skilled in the art without departing from the scope of the invention set forth in the claims.

What is claimed is:

1. A method of manufacturing an optical diffuser to improve photon capture for improved photochemical reactions, comprising:

forming lenslets on glass or plastic to remove any sharp scattering surfaces to form an optical diffuser;

coupling a container with said optical diffuser, wherein said coupling is without an intervening refractive layer, wherein said container is configured to hold a chemical comprising a photoreactive chemical that absorbs at least a portion of light transmitted through the optical diffuser to undergo a light-induced chemical reaction;

wherein said container is transmissive of said light transmitted through said optical diffuser;

wherein said container is configured to enable said photoreactive chemical to be at least partially introduced into said container;

wherein said container comprises a photochemical reaction container configured to enable irradiation of said photoreactive chemical with said light emitted by a light source positioned outside the photochemical reaction container, wherein said light travels through the optical diffuser and into the photoreactive chemical;

wherein said lenslets transmit over 80% of said light through said optical diffuser and into the photoreactive chemical while reducing scattering losses.

2. The method of manufacturing an optical diffuser to improve photon capture for improved photochemical reactions of claim 1, further comprising:

utilizing an acid to form said lenslets on said glass or said plastic to remove any of said sharp scattering surfaces.

3. The method of manufacturing an optical diffuser to improve photon capture for improved photochemical reactions of claim 1, further comprising:

utilizing a solvent to form said lenslets on said plastic to remove any of said sharp scattering surfaces.

4. The method of manufacturing an optical diffuser to improve photon capture for improved photochemical reactions of claim 1, further comprising:

utilizing a laser to form said lenslets on said glass or said plastic to form micro-optics on one or both surfaces of said glass or said plastic, wherein said laser operates at a pico or femto second time frame.

5. The method of manufacturing an optical diffuser to improve photon capture for improved photochemical reactions of claim 1, further comprising:

utilizing lithography to form said lenslets on said glass or said plastic to form micro-optics on one or both surfaces.

6. The method of manufacturing an optical diffuser to improve photon capture for improved photochemical reactions of claim 1, wherein the lenslets are configured to refract incident light while inhibiting light scattering through the optical diffuser.

7. The method of manufacturing an optical diffuser to improve photon capture for improved photochemical reactions of claim 1, wherein the container comprises a reaction chamber, flask, beaker, tube, or reactor vessel configured to contain said photoreactive chemical.

8. The method of manufacturing an optical diffuser to improve photon capture for improved photochemical reactions of claim 1, wherein the optical diffuser is configured to homogenize radiation to provide more uniform, controlled radiation of the chemical within the container and to reduce hot spots and photon shadowing within the chemical.

9. The method of manufacturing an optical diffuser to improve photon capture for improved photochemical reactions of claim 1, wherein the optical diffuser is formed on an inner surface of the container.

10. The method of manufacturing an optical diffuser to improve photon capture for improved photochemical reactions of claim 1, wherein said lenslets are formed on both an inner surface and an outer surface of the container.

11. The method of manufacturing an optical diffuser to improve photon capture for improved photochemical reactions of claim 1, wherein said forming said lenslets comprises abrading a surface and subsequently chemically passivating the surface that is abraded to remove sharp microfacets that cause backward or lateral light scattering.

12. The method of manufacturing an optical diffuser to improve photon capture for improved photochemical reactions of claim 1, wherein said lenslets are configured to refract and angularly redistribute incident light to homogenize photon flux within an interior reaction volume of said container.

13. The method of manufacturing an optical diffuser to improve photon capture for improved photochemical reactions of claim 1, wherein said optical diffuser exhibits light transmission of greater than 80% in at least one of ultraviolet, visible, or infrared wavelength ranges used to drive the light-induced chemical reaction.

* * * * *